(12) United States Patent
Farrand et al.

(10) Patent No.: US 9,151,871 B2
(45) Date of Patent: *Oct. 6, 2015

(54) COLOURED POLYMER PARTICLES

(75) Inventors: Louise Diane Farrand, Dorset (GB); Jonathan Henry Wilson, Southampton (GB); Emily Jane Thomas, Bournemouth (GB); Ashley Nathan Smith, Southampton (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/240,435

(22) PCT Filed: Jul. 28, 2012

(86) PCT No.: PCT/EP2012/003226
§ 371 (c)(1),
(2), (4) Date: Feb. 24, 2014

(87) PCT Pub. No.: WO2013/026519
PCT Pub. Date: Feb. 28, 2013

(65) Prior Publication Data
US 2014/0209829 A1    Jul. 31, 2014

(30) Foreign Application Priority Data
Aug. 24, 2011    (EP) .................................... 11006912

(51) Int. Cl.
| C08K 5/05 | (2006.01) |
| C08F 8/30 | (2006.01) |
| G02B 1/04 | (2006.01) |
| C08K 3/00 | (2006.01) |
| C09B 67/46 | (2006.01) |
| G02F 1/167 | (2006.01) |

(52) U.S. Cl.
CPC ................ G02B 1/04 (2013.01); C08K 3/0033 (2013.01); C09B 67/009 (2013.01); G02F 1/167 (2013.01)

(58) Field of Classification Search
USPC ........................................................ 524/379
See application file for complete search history.

(56) References Cited

U.S. PATENT DOCUMENTS

| 5,380,362 | A |  | 1/1995 | Schubert |
| 5,403,518 | A |  | 4/1995 | Schubert |
| 5,492,646 | A |  | 2/1996 | Langley et al. |
| 5,582,700 | A |  | 12/1996 | Bryning et al. |
| 5,783,614 | A |  | 7/1998 | Chen et al. |
| 6,194,488 | B1 |  | 2/2001 | Chen et al. |
| 6,956,690 | B2 |  | 10/2005 | Yu et al. |
| 7,038,655 | B2 |  | 5/2006 | Herb et al. |
| 7,052,766 | B2 |  | 5/2006 | Zang et al. |
| 7,110,162 | B2 |  | 9/2006 | Wu et al. |
| 7,170,670 | B2 |  | 1/2007 | Webber |
| 7,226,550 | B2 |  | 6/2007 | Hou et al. |
| 7,236,290 | B1 |  | 6/2007 | Zhang et al. |
| 7,247,379 | B2 | * | 7/2007 | Pullen et al. ................... 428/407 |
| 7,277,218 | B2 |  | 10/2007 | Hwang et al. |
| 7,304,634 | B2 |  | 12/2007 | Albert et al. |
| 8,901,219 | B2 |  | 12/2014 | Farrand et al. |
| 2007/0128352 | A1 |  | 6/2007 | Honeyman et al. |
| 2007/0268244 | A1 |  | 11/2007 | Chopra et al. |
| 2010/0120948 | A1 | * | 5/2010 | Gane et al. ......................... 524/5 |

FOREIGN PATENT DOCUMENTS

| EP | 1491941 A2 | 12/2004 |
| GB | 2438436 A | 11/2007 |
| WO | WO-99/10767 A1 | 3/1999 |
| WO | WO-2005017046 A2 | 2/2005 |
| WO | WO-2008003604 A2 | 1/2008 |
| WO | WO-2009100803 A2 | 8/2009 |
| WO | WO-2011154103 A1 | 12/2011 |

OTHER PUBLICATIONS

Sunohara et al., The Imaging Society of Japan, 46(4), 247-253, 2007.*

Sunohara, Seiji, et al., "Investigation of Color Electrophoretic Display Utilizing Electrophoretic Colored Particles," 46 *Nippon Gazo Gakkaishi* 247-53 (2007).

Sunohara, Seiji, et al., "Preparation of poly-vinyl pyrrolidone fine particles by inverse emulsifications-evaporation process in solvent," 62 *Kobunshi Ronbunshu* 310-15 (2005).

International Search Report for PCT/EP2012/003226 mailed Feb. 8, 2013.

Guthrie, JT., "Polymeric Colorants", Rev. Prog. Coloration, vol. 20, 1990, pp. 40-52.

* cited by examiner

*Primary Examiner* — Hui Chin
(74) *Attorney, Agent, or Firm* — Drinker Biddle & Reath LLP

(57) ABSTRACT

This invention relates to colored polymer particles prepared by a reverse emulsion solvent removal process, electrophoretic fluids comprising such particles, and electrophoretic display devices comprising such fluids.

22 Claims, No Drawings

COLOURED POLYMER PARTICLES

CROSS-REFERENCE TO RELATED APPLICATIONS

This application is a national stage application (under 35 U.S.C. §371) of PCT/EP2012/003226, filed Jul. 28, 2012, which claims benefit of European Application No. 11006912.7, filed Aug. 24, 2011, both of which are incorporated herein by reference in their entirety.

This invention relates to coloured polymer particles prepared by a reverse emulsion solvent removal process, electrophoretic fluids comprising such particles, and electrophoretic display devices comprising such fluids.

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged particles dispersed in a fluid and constrained between two substrates, each comprising one or more electrodes. The space between the electrodes is filled with a dispersion medium which is colourless or a different colour to the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white or light colour. However, the main disadvantage of state of the art EPDs is the lack of a bright full colour system.

The use of different coloured particles in a single pixel has been exemplified in recent patent literature (U.S. Pat. No. 7,304,634, GB 2 438 436, US 2007/0268244), but all of these approaches require the use of complex cell structures and drive schemes. Two particle systems comprising inorganic and resin particles are also known (EP 1 491 941). These coloured particles are only achievable by complicated processes and/or they are only suitable for specific applications. Particles comprising a polymer and an organic pigment are described in Nippon Gazo Gakkaishi 46(4) 2007, 247-253 and in Kobunshi Ronbunshu, 62(7), 310-315 (July 2005).

There continues to be a demand for improved electrophoretic fluids and a simple preparation of coloured particles which can be easily dispersed in non-polar media. An improved route to provide coloured particles and new electrophoretic fluids has now been found.

The present invention relates to a process for the preparation of coloured or black polymer particles comprising the steps of a) forming a reverse emulsion comprising at least one polymer, at least one coloured or black inorganic pigment, at least one polar solvent, at least one non-polar solvent, and at least one surfactant and b) removing the polar solvent or polar solvents by evaporative methods. The subject matter of this invention relates specifically to coloured and black polymer particles prepared by such process, and to electrophoretic fluids and displays, for example full colour e-papers, comprising such coloured polymer particles.

Throughout the specification, "reverse emulsion" means that a non-polar solvent (e.g. dodecane, or comparable aliphatic hydrocarbons) forms the continuous phase and a polar solvent (preferably water) forms the discontinuous phase (internal phase). Furthermore, the present process is called either "evaporative precipitation" or "reverse emulsion solvent removal" (RESR) due to the steps involved in forming a reverse emulsion and then removing the solvent from the internal phase by evaporative methods to form a solid particle.

The new process to achieving coloured and black particles is to incorporate at least one coloured or black inorganic pigment into an organic polymer particle. Black as well as coloured reflective inorganic pigments may be used separately or in combinations. In this process, by simply changing one inorganic pigment for another inorganic pigment, the colour of the particles being prepared can be changed without adversely affecting other particle properties.

The new route provides a simple, repeatable and cheap preparation of charged highly reflective coloured or black particles which can be easily dispersed in non-polar media, show electrophoretic mobility and which do not leach colour in a dispersant. The new process does not require multiple steps or require expensive drying steps followed by difficult formulation into a low dielectric solvent. The new process provides coloured and black polymer particles suitable for EPD and it is possible to manipulate charge, size, monodispersity, steric stability etc. separately in order to produce particles with all the desired features for EPD. Furthermore, the use of largely non-hazardous materials is preferred. Advantageously, commercially available materials can be used and the method does not require any chemical changes. The method developed is a simple process using as few as possible physical processes to yield the final electrophoretic fluid by forming a reverse emulsion and evaporating the internal phase solvent yielding a dispersion of solid particles. Preferably, polymer particles prepared by the present process show good light fastness, heat stability, and bleed and migration resistance.

Further advantages of the present invention are that it is possible to have charged particles of appropriate colours e.g. red, green and blue as well as black particles and to be able to prepare coloured and black particles of a desired size and which may have a high mono-dispersity, and which incorporate a charge, to enable electrophoretic movement. The present route provides coloured polymer particles with a low average density Access to materials of this type will facilitate the construction of electrophoretic displays without the need of an additional colour filter.

A main advantage of the present process is that the particles are formed directly in a solvent which is highly suitable for an EPD fluid without having to dry particles, and then re-disperse them; in particular expensive freeze drying steps can be avoided. The process also avoids potential irreversible damage to the particle surface brought about by a drying process. The process is even more advantageous in that no solvent transfer step is required to change to the final solvent suitable for use as an electrophoretic fluid. Therefore, no unwanted solvent contamination occurs in the final formulation. Also transfer to other solvents suitable for EPD is easily possible if required.

In addition, the particles may have the following properties: a glassy polymer nature for optical clarity and colour compatibility, a homogeneous structure for solvent resistance, a non-swelling nature when dispersed in EPD solvent media, impact strength, hardness, dispersibility in a non-polar continuous phase that is the most used media for EPD, high electrophoretic mobility in dielectric media, universal applicability for all colours and black, accurate zeta potential control, all colours have same density (good for sedimentation/agglomeration performance), excellent switching behaviour, faster response times at comparable voltages. Additionally the low solubility of the materials in the continuous phase also reduces the tendency of the particles to undergo Ostwald ripening processes.

An essential component of the present invention is a coloured or black inorganic pigment, preferably a coloured reflective or black pigment. Especially, black, red, green, yellow, and/or blue pigments, particularly black, red, green, and/or blue pigments, are used. According to general knowledge, the optical effect of coloured inorganic pigments is caused by selective light absorption and also to a large extent by selective light scattering, and the optical effect of black inorganic pigments is caused by non-selective light absorption. Preferably, the inorganic pigments may be dispersible in the polar solvent. The function of the pigment is to colour the particle. Preferably the following pigments are used: metal compounds, e.g. oxides, mixed oxides, oxide hydroxides, sulfides, sulfoselenides, silicates, sulfates, chromites, molybdates, and/or carbonates, and/or carbon black pigments, preferably oxides, mixed oxides, oxide hydroxides, chromites, and/or carbonates, and/or carbon black pigments. Preferred metal compounds comprise the following metals: iron, chromium, cadmium, nickel, zinc, cobalt, and/or manganese. Preferred pigments are: Red Iron Oxide, Green Chromium Oxide, Azuri Blue pigment, Yellow Iron Oxide pigment, Manganese Ferrite pigment, black copper chromite pigment, black iron (III) oxide pigment, and carbon black pigments. Examples of suitable commercially available pigments are given below (C.I. Numbers are in brackets):

Iron Oxide Red (Pigment Red 101), Molybdate Red (Pigment Red 104), Lead Oxide red (Pigment Red 105), Cadmium Red (Pigment Red 108), Oxide Red (PR102), Chromium Oxide Green (Pigment Green 17), Cadmium Green (PG14), Paris Green (PG21), Scheele's Green (PG22)

Milori Blue (Pigment Blue 27), Ultramarine Blue (Pigment Blue 29), Cobalt Blue (PB28, Azuri Blue), Cerulean Blue (PB35), Han Blue $BaCuSi_4O_{10}$, Egyptian Blue (PB31), Prussian Blue (PB27)

Iron Oxide Black (Pigment Black 11) $Fe_3O_4$, Titanium Black, Carbon Black (Pigment Black 7), Manganese Ferrite pigment, black copper chromite pigment Chrome Yellow (Pigment Yellow 34), Zinc Yellow (Pigment Yellow 36), Cadmium Yellow (PY34), Iron Oxide (Pigment Yellow 34), Aureolin (PY40), Yellow Ochre (PY43), Naples Yellow (PY41), Titanium Yellow (PY53), Mosaic Gold (SnS2)

Orange Chrome Yellow (Pigment Orange 21), Cadmium Orange (PO20) Iron Oxide Brown (Pigment Brown 6), Raw Umber (PBr7), Raw Sienna (PBr7), Han Purple ($BaCuSi_2O_6$)

Coloured or black inorganic pigments with a spherical particle shape are preferred. Especially, inorganic pigments with a primary particles size in the range of 10-1800 nm, preferably in the range of 100-1600 nm, are used in the present RESR process.

The inorganic pigments used often contain agglomerates of the primary particles. Such agglomerates may show a secondary particle size in the range of 100 nm-3000 nm, preferably in the range of 100-2000 nm. Preferably, the primary particle size is regained as far as possible before further physical processes. Methods can include milling (sand mill, pearl mill and ball mill), use of a rotor-stator (e.g. an Ika Ultra-Turrax), and application of ultrasound to achieve a dispersion. Typically a Branson Sonifier can be used.

The charge of coloured or black polymer particles can be easily controlled by using uncharged or charged materials (positive or negative), e.g. using a polymer which has $SO_3^-$ and $Na^+$ groups available to provide charge into a particle. Alternatively, non-charged polymers may be used and the particles can be charged by using charged surfactants at the formulation stage.

The new particles can be prepared from many polymer types. Preferably, the polymer is produced from a monomer which is insoluble in non-polar solvents such as dodecane or the monomer is soluble but the polymer insoluble in non-polar solvents such as dodecane. Polymers which are particularly suitable are those which are highly hydrophilic or are charged to render themselves hydrophilic, especially preferred are for example poly(acrylamide), poly(acrylic acid) and poly(methacrylic acid).

Further suitable and commercially available polymers are: Poly(2-acrylamido-2-methyl-1-propanesulfonic acid), Poly (2-acrylamido-2-methyl-1-propanesulfonic acid-co-acrylonitrile) acrylonitrile, Poly(N-isopropylacrylamide), Poly (acrylamide-co-acrylic acid), Poly(acrylamide-co-acrylic acid) partial sodium salt, Poly(acrylamide-co-acrylic acid) potassium salt, Polyacrylamide, Poly(acrylic acid sodium salt), Poly(acrylic acid), Poly(acrylic acid) partial potassium salt, Poly(acrylic acid) partial sodium salt, Poly(acrylic acid), partial sodium salt-graft-poly(ethylene oxide), Poly(acrylic acid-co-maleic acid) sodium salt, Poly(ethylene-alt-maleic anhydride), Poly(isobutylene-co-maleic acid) sodium salt, Poly(methyl vinyl ether-alt-maleic acid monobutyl ester), Poly(methyl vinyl ether-alt-maleic acid), Poly(methyl vinyl ether-alt-maleic anhydride), Poly(styrene-alt-maleic acid), Poly(1-vinylpyrrolidone-co-2-dimethylaminoethyl methacrylate), Poly(2-dimethylamino)ethyl methacrylate) methyl chloride quaternary salt, Poly(2-ethylacrylic acid), Poly(2-hydroxyethyl methacrylate), Poly(2-hydroxypropyl methacrylate), Poly(2-propylacrylic acid), Poly(methacrylic acid, sodium salt), Poly[(2-ethyldimethylammonioethyl methacrylate ethyl sulfate)-co-(1-vinyl pyrrolidone)], Poly[ethyl acrylate-co-methacrylic acid-co-3-(1-isocyanato-1-methylethyl)-α-methylstyrene], adduct with ethoxylated nonylphenol, Cucurbit[5]uril, Cucurbit[7]uril, Cucurbit[8]uril, Ethylenimine, oligomer, Poly(2-ethyl-2-oxazoline), Poly(2-isopropenyl-2-oxazoline-co-methyl methacrylate), Poly (acrylamide-co-diallyldimethylamnmonium chloride), Poly (allylamine hydrochloride), Poly(allylamine), Poly (diallyldimethylammonium chloride), Poly(dimethylamine-co-epichlorohydrin-co-ethylenediamine), Poly (ethyleneimine), Poly[bis (2-chloroethyl) ether-alt-1,3-bis[3-(dimethylamino)propyl]urea] quaternized, Polyethylenimine, 80% ethoxylated, Polyethylenimine, branched, 2-Dode-cenylsuccinic polyglyceride, Glycerol propoxylate average, Poly(methyl vinyl ether), Polyepoxysuccinic acid, Poly(4-styrenesulfonic acid) ammonium salt, Poly(4-styrenesulfonic acid) lithium salt, Poly(4-styrenesulfonic acid), Poly(4-styrenesulfonic acid-co-maleic acid) sodium salt, Poly(anetholesulfonic acid, sodium salt), Poly(sodium 4-styrenesulfonate), Poly(vinyl acetate-co-crotonic acid), Poly(vinyl sulfate) potassium salt, Poly(vinylphosphonic acid), Poly(vinylsulfonic acid, sodium salt), Mowiol, Poly(vinyl alcohol), Poly(vinyl alcohol-co-ethylene).

Most preferred are poly(acrylamide), poly(1-vinylpyrrolidone-co-2-dimethylaminoethyl methacrylate), and poly (acrylic acid) and poly(methacrylic acid) or their corresponding alkali salts, especially poly(acrylamide) and poly(acrylic acid).

Charging the polymer can also be facilitated by using during polymer preparation an initiator which is charged leaving that charge residing as an end-group on the polymer. Such examples are 2,2'-azobis(2-methylpro-pionamidine)dihydrochloride (V-50) (Wako Chemicals), potassium peroxodisulfate (KPS), ammonium peroxodisulfate (APS), sodium peroxodisulfate (SPS), 2,2'-azobiscyanovaleric acid (ACVA) (Wako Chemicals), 2,2'-azobis[2-(2-imidazolin-2-yl)propane]dihydrochloride (VA044) (Wako Chemicals).

However, charging does not have to come from the initiator fragment so initiators which can also be used are those such as 2,2'-azobis(isobutyro-nitrile) (AIBN) (Wako Chemicals), 2,2'-azobis(2-methylbutyronitrile) (Vazo 67) (Wako Chemicals) and benzoyl peroxide.

Further essential components of the present process are surfactants, generally having a hydrophilic head group and a hydrophobic tail. Preferable examples are those with a hydrophilic-lipophilic balance HLB (as described in "Introduction to Surface and Colloid Chemistry" (Ed. DJ Shaw, Pub. Butterworth Heinemann)) less than 10, preferably between 2 and 8 and more preferably 3 and 6. HLB of a surfactant is a measure of the degree to which the surfactant is hydrophilic or lipophilic, determined by calculating values for the different regions of the molecule. The head group may be a salt to allow charging or can also consist of an amine or acid moiety which can also, but does not have to, charge the particle.

The role of the surfactant is to stabilize the reverse emulsion when it is formed and then to stabilize the solid particles after solvent removal. The surfactant can also be used to charge the particles, allowing them to switch electrophoretically. This may be achieved by using a blend of surfactants or one single surfactant. Preferably the surfactant is used in 1-10% by weight based on the total reverse emulsion.

Preferable surfactant additives have some form of block, branched, graft or comb-like structure to maximize physical or chemical adsorption onto the surface of the particles. Long or branched hydrophobic tails are preferable to maximize the steric stabilization of the surfactant. Suitable head groups are polyol derivatives such as glycerol or sorbitan. These provide an appropriate polarity to bind to the pigment surface. Also suitable are succinimide based surfactants, and alkyl sulfosuccinates. Surfactant combinations may also be used.

Typical surfactants (either by steric stabilisation or by use as a charging agent) are known to experts in the field and include (but are not limited to) the Brij, Span and Tween series of surfactants (Aldrich) Infineum surfactants (Infineum), the Solsperse, Ircosperse and Colorburst series (Lubrizol), the OLOA charging agents (Chevron Chemicals) and Aerosol-OT (A-OT) (Aldrich). Preferable surfactant additives in this work are Solsperse range and A-OT, and even more preferably Solsperse 17,000 and A-OT.

Solvents for the two phases of the reverse emulsion are preferably chosen to be as immiscible as possible whilst being good solvents for the components. Preferably the solvents are used in a weight ratio range for continuous phase to discontinuous phase of from 5:1 to 1:1, preferably 3.5:1 to 1:1.

The continuous phase (preferably dodecane) is required to be a good solvent for the surfactants being used and the discontinuous phase must be a good solvent for the pigment and polymer matrix material used (preferably water).

The continuous phase solvent can be chosen primarily on the basis of dielectric constant E, refractive index, density and viscosity. A preferred solvent choice would display a low dielectric constant $\in$, preferably $\in<10$, more preferably $\in<5$, especially $\in<3$. Preferably the continuous phase solvent shows a high volume resistivity (about $10^{15}$ ohm-cm), a low viscosity (less than 5 cst), low water solubility, a high boiling point (preferably >80° C.) and a refractive index and density similar to that of the polymer used in step a). Adjustments of these variables in order to change the behaviour of the final application are known in the art. Preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. Preferably dodecane ($\in=2.0$), tetradecane, decane ($\in=2.0$), nonane, dimethyltetralin ($\in=2.26$), decalin ($\in=2.7$), naphtha ($\in=2.0$), tetrahydronaphthalene ($\in=2.8$), and mixtures thereof, especially dodecane or dimethyltetralin are used. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents. Especially preferred as continuous phase solvents are dodecane and/or dimethyltetralin.

The discontinuous phase solvent is chosen primarily on the dispersibility of the coloured and black inorganic pigment and the solubility of the polymer matrix components, its boiling point relative to that of the continuous phase and its solubility in the continuous phase. A preferred discontinuous phase solvent shows a high dielectric constant c, preferably $\in>20$, more preferably >40, especially >50. Those solvents particularly suitable are water, low molecular weight alcohols, industrial methylated spirits (IMS; typically comprising 94 vol. % ethanol, 4 vol. % methanol, 2 vol. % water), and some of the more hydrophilic solvents from ketones, aldehydes, ethers and esters. Further suitable solvents could also include highly polar solvents such as acetonitrile, DMSO (dimethyl sulfoxide) and DMF (dimethylformamide). Preferably water, low molecular weight alcohols, acetonitrile, DMSO, DMF or mixtures thereof, preferably water and/or ethanol, are used. The most preferred solvent is water ($\in=80$).

The solvent selected must have a boiling point lower than that of the continuous phase to allow its removal and it is also important to consider any azeotropes which may form restricting removal of the discontinuous phase solvent. Solvents which are particularly suitable for these 2 emulsion phases are a dodecane continuous phase and a water or ethanol, or industrial methylated spirits, preferably water, discontinuous phase.

The present process comprises the steps of a) forming a reverse emulsion comprising at least one polymer, at least one coloured or black inorganic pigment, at least one polar solvent, at least one non-polar solvent, and at least one optionally charged surfactant, b) removing the polar solvent or polar solvents by evaporative methods and c) optionally removing the non-polar solvent or non-polar solvents. It is especially advantageous that step c) can be omitted if the continuous phase consists of the solvent intended for use in the electrophoretic solvent. If requested, purification of the polymer particles according to the invention is possible by methods familiar to the person skilled in the art, such as filtration, centrifuging, and sieving.

Preferably, the reverse emulsion of step a) consists of at least one polymer, at least one coloured or black inorganic pigment, at least one polar solvent, at least one non-polar solvent, and at least one optionally charged surfactant.

The reverse emulsion of step a) is prepared by a1) forming a polar phase by mixing at least one polymer, at least one coloured or black inorganic pigment, and at least one polar solvent, a2) forming a non-polar phase by mixing at least one non-polar solvent, and at least one surfactant, a3) combining the polar phase and the non-polar phase, and a4) homogenising the combined phases to form the reverse emulsion.

Preferably, the process of the invention consists of steps a), b), and optionally c). Most preferred is a process consisting of steps a1), a2), a3), a4), b), and optionally c).

It is most preferred that in step a1) the following components are used 1) a coloured or black inorganic pigment, 2) a polymer selected from poly(acrylamide), and poly(acrylic acid) and poly(methacrylic acid) or their corresponding alkali salts, and 3) water, and that a surfactant and dodecane are used in step a2). Preferred pigments are: Red Iron Oxide, Green Chromium Oxide, Azuri Blue 34L2000 pigment, Yellow Iron Oxide pigment, Manganese Ferrite pigment, black copper chromite pigment, carbon black, and black iron (III) oxide pigment.

Preferred combinations comprise water as discontinuous solvent; dodecane as continuous solvent, polyacrylamide or polyacrylic acid as polymer, and a surfactant, e.g. Solsperse 17000 or Solsperse 11000 or Solsperse 13650 or SolPlus K500. Preferred pigments used herewith are Red Iron Oxide, Green Chromium Oxide, Azuri Blue, Yellow Iron Oxide, Black Copper Chromite, Black Iron Oxide or Carbon Black.

Preferably polyacrylic acid is used in combination with Black Copper Chromite or Carbon Black.

Preferred coloured polymer particles are prepared from the following mixtures:
(1) water, Red Iron Oxide (Ferroxide Red/Rosso 216M), polyacrylamide, surfactant, dodecane;
(2) water, Green Chromium Oxide, polyacrylamide, surfactant, dodecane;
(3) water, Azuri Blue 34L2000 pigment, polyacrylamide, surfactant, dodecane;
(4) water, Yellow Iron Oxide, polyacrylamide, surfactant, dodecane;
(5) water, Black Copper Chromite (Black 34E33 basalt), polyacrylamide, surfactant, dodecane;
(6) water, Black Iron Oxide, polyacrylic acid, surfactant, dodecane;
(7) IMS, carbon black, polyacrylic acid, surfactant, dodecane.

The reverse emulsion is preferably formed using some form of shear. This shear may be in the form of high shear homogenisation by for example a Silverson homogeniser or sonication by for example a Branson Sonifier. It is often advantageous to form a reverse pre-emulsion using low shear and then higher shear to form the desired particle size. The shear is preferably applied once the non-polar continuous phase and polar discontinuous phase have been formed, separately mixed until homogeneous and then combined to form a 2-phase system. Additionally, shear may be advantageous to form the aqueous phase which can be done using high shear homogenisation or sonication.

Particles can be optionally cross-linked in this method by inclusion of reactive side groups in the components which comprise the particle. Cross-linking can be facilitated for example by post particle formation polymerisation initiated by UV or heat, or by reaction of side groups driven by removal of the polar solvent. These reactions preferably need no further synthetic step than those already used to remove the solvent and form particles.

The present coloured polymer particles comprise preferably 10-75%, especially 15-65%, by weight of at least one inorganic pigment based on the combined weights of the polymer, surfactant and pigment.

The present coloured polymer particles are preferably spherical particles with a size (diameter) in the range of 100-2000 nm and preferably with a monodisperse size distribution. Preferred particle sizes are 200-1900 nm, preferably 200-1500 nm. Particle sizes are determined by photon correlation spectroscopy by a common apparatus such as a Malvern NanoZS particle analyser. Larger agglomerates that eventually form during the reaction can be removed post reaction. Methods include filtering, centrifuging, sieving. Typically a 5 micron filter cloth is used. Centrifuging can also be employed to remove smaller unwanted polymer particles that may be formed during the reaction.

Particles of the invention are primarily designed for use in electrophoretic displays, especially for use in mono, bi or polychromal electrophoretic devices. Especially, spherical particles with a particle size as described above in the range of 100-2000 nm, preferably in the range of 200-600 nm, are preferably used in EPDs. A typical electrophoretic display preferably consists of the particles dispersed in a low polar or non-polar solvent along with additives to improve electrophoretic properties, such as stability and charge. Examples of such dispersions are well described in the literature, for example U.S. Pat. No. 7,247,379; WO 99/10767; US 2007/0128352; U.S. Pat. No. 7,236,290; U.S. Pat. No. 7,170,670; U.S. Pat. No. 7,038,655; U.S. Pat. No. 7,277,218; U.S. Pat. No. 7,226,550; U.S. Pat. No. 7,110,162; U.S. Pat. No. 6,956,690; U.S. Pat. No. 7,052,766; U.S. Pat. No. 6,194,488; U.S. Pat. No. 5,783,614; U.S. Pat. No. 5,403,518; U.S. Pat. No. 5,380,362.

Typical additives to improve the stability of the fluid (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant ($<10$, more preferably $<5$), high volume resistivity (about $10^{15}$ ohm-cm), a low viscosity (less than 5 cst), low water solubility, a high boiling point ($>80°$ C.) and a refractive index and density similar to that of the particles. Adjustment of these variables can be useful in order to change the behaviour of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable.

For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), Infineum surfactants (Infineum), and dodecane (Sigma Aldrich).

Usually electrophoretic fluids comprise a charged inorganic nanoparticle such as titania, alumina or barium sulphate, coated with a surface layer to promote good dispersibility in dielectric media and a dielectric fluid media. Preferably, coloured polymer particles according to the invention are used in combination with black particles, especially with black polymer particles, particularly in combination with black polymer particles according to the invention. White reflective polymer particles, optionally cross-linked, made by a reverse emulsion solvent removal process comprising the steps of a) forming a reverse emulsion comprising at least one polymer, at least one white reflective particle, preferably titanium dioxide or zinc oxide, at least one polar solvent, at least one non-polar solvent, and at least one optionally charged surfactant, b) removing the polar solvent or polar solvents by evaporative methods and c) optionally removing the non-polar solvent or non-polar solvents, may preferably be used. The solvents and additives used to disperse the particles are not limited to those used within the examples of this invention and many other solvents and/or dispersants can be used. Lists of suitable solvents and dispersants for electrophoretic displays can be found in existing literature, in particular WO 99/10767 and WO 2005/017046 The Electrophoretic fluid is then incorporated into an Electrophoretic display element by a variety of pixel architectures, such as can be found in C. M. Lampert, Displays; 2004, 25(5) published by Elsevier B.V., Amsterdam.

The Electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are thus expressly also part of the disclosure content of the present application. Unless the context clearly indicates otherwise, plural forms of the terms used herein are to be construed as including the singular form and vice versa. All of the features of the invention disclosed may be used in any combination, unless clearly indicates otherwise. Particularly, the preferred features of the invention may be used in any combination. Further variants of the invention and combinations of features, especially preferred features are disclosed in and/or derive from the claims and the examples. The following examples explain the present invention in greater detail without restricting the scope of protection.

EXAMPLES

All solvents except water were purchased from VWR at the highest grade possible and were used without further purification. The water used was de-ionised. Polyacrylic acid (Mw 250,000, 35% in water) and polyacrylamide (Mw 10,000, 50% in water) were purchased from Sigma-Aldrich and were used without further purification. Solsperse 17,000, 11,000, 13650 and Solplus K500 were provided by Lubrizol and were used without further purification. All pigments were purchased from Rockwood and used without further purification unless otherwise stated. Dodecane and AOT are obtained from Sigma-Aldrich, Span 85 from Fluka.

The characterisation of the formulations was performed using a Malvern NanoZS particle analyser. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Example 1

Preparation of a Dispersion of Red Iron Oxide-Poly(Acrylamide) Particles

An aqueous phase is formed by combining water (17.6 g), Red Iron Oxide (Ferroxide Red/Rosso 212M) (3.0 g) and poly(acrylamide) (9.6 g of a 50 wt % solution in water). This dispersion is stirred until homogeneous and is then submitted to high shear homogenisation by a Branson Sonifier 450 using a horn probe at 40% strength for 5 minutes.

In a separate 3-neck flask an oil phase is formed by combining Solsperse 17000 (2.4 g) and dodecane (60 g). This solution is stirred until homogeneous.

The aqueous phase is then added to the oil phase, and stirring is maintained for 4 further minutes. The pre-emulsion is then submitted to homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 40 mbar, in steps of 10 mbar every 20 minutes. Once 40 mbar pressure has been reached, the solution is held under this pressure and temperature for 2 hours after which time room temperature and atmospheric pressure are resumed. On completion, the product is obtained as a suspension of red reflective particles of iron oxide in a matrix of poly(acrylamide), stabilised by Solsperse 17,000 and dispersed in dodecane (13.7% solids content).

Example 2

Preparation of a Dispersion of Red Iron Oxide-Poly(Acrylamide) Particles

An aqueous phase is formed by combining water (17.6 g), Red Iron Oxide (Ferroxide Red/Rosso 212M) (6.0 g) and poly(acrylamide) (9.6 g of a 50 wt % solution in water). This dispersion is stirred until homogeneous and is then submitted to high shear homogenisation by a Branson Sonifier 450 using a horn probe at 40% strength for 5 minutes.

In a separate 3-neck flask, an oil phase is formed by combining Solsperse 17000 (2.4 g) and dodecane (60 g). This solution is stirred until homogeneous. An IKA homogeniser is inserted and used at 10000 rpm for approximately 1 minute.

The aqueous phase is then added drop wise to the oil phase over 2 minutes, and homogenised using high shear stirring is maintained for 3 further minutes. The pre-emulsion is then submitted to high shear homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 40 mbar, in steps of 10 mbar every 20 minutes. Once 40 mbar pressure has been reached, the solution is held under this pressure and temperature for 2 hours after which time room temperature and atmospheric pressure are resumed. On completion, the product is obtained as a suspension of red reflective particles of iron oxide in a matrix of poly(acrylamide), stabilised by Solsperse 17,000 and dispersed in dodecane (13.7% solids content).

Example 3

Preparation of a Dispersion of Red Iron Oxide-Poly(Acrylamide) Particles

An aqueous phase is formed by combining water (17.6 g), Red Iron Oxide (Ferroxide Red/Rosso 216M) (12.0 g) and poly(acrylamide) (9.6 g of a 50 wt % solution in water). This dispersion is stirred until homogeneous and is then submitted to homogenisation by a Branson Sonifier 450 using a horn probe at 40% strength for 5 minutes.

In a separate 3-neck flask an oil phase is formed by combining Solsperse 17000 (2.4 g) and dodecane (60 g). This solution is stirred until homogeneous. An IKA homogenises is inserted and used at 10000 rpm for approximately 1 minute.

The aqueous phase is then added drop wise to the oil phase over 2 minutes, and high shear stirring is maintained for 3 further minutes. The pre-emulsion is then submitted to homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 40 mbar, in steps of 10 mbar every 20 minutes. Once 40 mbar pressure has been reached, the solution is held under this pressure and temperature for 2 hours after which time room temperature and atmospheric pressure are resumed. On completion, the product is obtained as a suspension of red reflective particles of Ferroxide Red/Rosso 216M in a matrix of poly(acrylamide), stabilised by Solsperse 17,000 and dispersed in dodecane.

Example 4

Preparation of a Dispersion of Green Chromium Oxide Poly(Acrylamide) Particles

An aqueous phase is formed by combining water (17.6 g), Green Chromium Oxide (3.0 g) and poly(acrylamide) (9.6 g of a 50 wt % solution in water). This dispersion is stirred until homogeneous and is then submitted to high shear homogenisation by a Branson Sonifier 450 using a horn probe at 40% strength for 5 minutes.

In a separate 3-neck flask an oil phase is formed by combining Solsperse 17000 (2.4 g) and dodecane (60 g). This solution is stirred until homogeneous.

The aqueous phase is then added to the oil phase, and stirring is maintained for 4 further minutes. The pre-emulsion is then submitted to homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 40 mbar, in steps of 10 mbar every 20 minutes. Once 40 mbar pressure has been reached, the solution is held under this pressure and temperature for 2 hours after which time room temperature and atmospheric pressure are resumed. On completion, the product is obtained as a suspension of green reflective particles of chromium oxide in a matrix of poly(acrylamide), stabilised by Solsperse 17,000 and dispersed in dodecane (14.0% solids content).

Example 5

Preparation of a Dispersion of Green Chromium Oxide Poly(Acrylamide)

An aqueous phase is formed by combining water (17.6 g), Green Chromium Oxide (12.0 g) and poly(acrylamide) (9.6 g of a 50 wt % solution in water). This dispersion is stirred until homogeneous and is then submitted to homogenisation by a Branson Sonifier 450 using a horn probe at 40% strength for 5 minutes.

In a separate 3-neck flask an oil phase is formed by combining Solsperse 17000 (2.4 g) and dodecane (60 g). This solution is stirred until homogeneous. An IKA homogeniser is inserted and used at 10000 rpm for approximately 1 minute.

The aqueous phase is then added dropwise to the oil phase over 2 minutes, and high shear stirring is maintained for 3 further minutes. The pre-emulsion is then submitted to homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 40 mbar, in steps of 10 mbar every 20 minutes. Once 40 mbar pressure has been reached, the solution is held under this pressure and temperature for 2 hours after which time room temperature and atmospheric pressure are resumed. On completion, the product is obtained as a suspension of green reflective particles of Green chrome oxide pigment in a matrix of poly(acrylamide), stabilised by Solsperse 17,000 and dispersed in dodecane.

Example 6

Preparation of a Dispersion of Azuri Blue Poly(Acrylamide) Particles

An aqueous phase is formed by combining water (17.6 g), Azuri Blue 34L2000 pigment (3.0 g) and poly(acrylamide) (9.6 g of a 50 wt % solution in water). This dispersion is stirred until homogeneous and is then submitted to high shear homogenisation by a Branson Sonifier 450 using a horn probe at 40% strength for 5 minutes.

In a separate 3-neck flask an oil phase is formed by combining Solsperse 17000 (2.4 g) and dodecane (60 g). This solution is stirred until homogeneous.

The aqueous phase is then added to the oil phase, and stirring is maintained for 4 further minutes. The pre-emulsion is then submitted to homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 40 mbar, in steps of 10 mbar every 20 minutes. Once 40 mbar pressure has been reached, the solution is held under this pressure and temperature for 2 hours after which time room temperature and atmospheric pressure are resumed. On completion, the product is obtained as a suspension of blue reflective particles of azuri blue pigment in a matrix of poly(acrylamide), stabilised by Solsperse 17,000 and dispersed in dodecane (14.0% solids content).

Example 7

Preparation of a Dispersion of Yellow Iron Oxide Poly(Acrylamide) Particles

An aqueous phase is formed by combining water (17.6 g), Yellow Iron Oxide pigment (3.0 g) and poly(acrylamide) (9.6 g of a 50 wt % solution in water). This dispersion is stirred until homogeneous and is then submitted to high shear homogenisation by a Branson Sonifier 450 using a horn probe at 40% strength for 5 minutes.

In a separate 3-neck flask an oil phase is formed by combining Solsperse 17000 (2.4 g) and dodecane (60 g). This solution is stirred until homogeneous.

The aqueous phase is then added to the oil phase, and stirring is maintained for 4 further minutes. The pre-emulsion is then submitted to homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 40 mbar, in steps of 10 mbar every 20 minutes. Once 40 mbar pressure has been reached, the solution is held under this pressure and temperature for 2 hours after which time room temperature and atmospheric pressure are resumed. On completion, the product is obtained as a suspension of blue reflective particles of yellow iron oxide pigment in a matrix of poly(acrylamide), stabilised by Solsperse 17,000 and dispersed in dodecane (13.7% solids content).

Example 8

Preparation of a Dispersion of Black Manganese Ferrite Poly(Acrylamide) Particles An aqueous phase is formed by combining water (17.6 g), (Ferritan Black FM2400) manganese ferrite pigment (3.0 g) and polyacrylamide (9.6 g of a 50 wt % solution in water). This dispersion is stirred until homogeneous and is then submitted to homogenisation by a Branson Sonifier 450 using a horn probe at 40% strength for 5 minutes.

In a separate 3-neck flask an oil phase is formed by combining Solsperse 17000 (2.4 g) and dodecane (60 g). This solution is stirred until homogeneous.

The internal phase is then added to the oil phase, and stirring is maintained for 3 further minutes. The pre-emulsion is then submitted to homogenisation by a Branson Sonifier 450 using a horn probe at 40% strength for 5 minutes to form the final emulsion. The emulsion is poured into a 500 ml Florentine flask and attached to a Buchi rotary evaporator. The bath temperature is set at 60° C. and the pressure is set at 100 mbar. Pressure is reduced in 10 mbar steps for approximately 10 minutes each time to 50 mbar pressure and left under these conditions for 1 hour to ensure removal of solvents. On completion, the product is obtained as a suspension of black particles of manganese ferrite pigment in a matrix of poly(acrylamide), stabilised by Solsperse 17,000 and dispersed in dodecane (19.7% solids content).

Example 9

Preparation of a Dispersion of Black Copper Chromite Poly(Acrylamide) Particles

An aqueous phase is formed by combining water (17.6 g), (Black 34E33 basalt) copper chromite pigment (12.0 g) and poly(acrylamide) (9.6 g of a 50 wt % solution in water). This dispersion is stirred until homogeneous and is then submitted to homogenisation by a Branson Sonifier 450 using a horn probe at 40% strength for 5 minutes.

In a separate 3-neck flask a continuous phase is formed by combining Solsperse 17000 (2.4 g) and dodecane (60 g). This solution is homogenised with an IKA high shear homogeniser at 10000 rpm.

The aqueous phase is then added dropwise to the oil phase, and high shear is maintained for 3 further minutes. The pre-emulsion is then submitted to homogenisation by a Branson Sonifier 450 using a horn probe at 40% strength for 5 minutes to form the final emulsion. Distillation equipment is attached to the flask. Stirring is started and the emulsion is warmed to 50° C. for 1 hour and maintained at 100 mbar. The water is removed by reducing the pressure to 50 mbar, in steps of 10 mbar every 20 minutes. Once 50 mbar pressure has been reached, the solution is held under this pressure and temperature for 1 hour after which time room temperature and atmospheric pressure are resumed. On completion, the product is obtained as a suspension of black particles of copper chromite pigment in a matrix of poly(acrylamide), stabilised by Solsperse 17,000 and dispersed in dodecane (33.1% solids content).

Example 10

Preparation of a Dispersion of Black Copper Chromite Poly(Acrylamide) Particles

Similarly to Example 9, black polymer particles are prepared using water (17.6 g), (Black 34E33 basalt) copper chromite pigment (3.0 g) and poly(acrylamide) (9.6 g of a 50 wt % solution in water), Solsperse 11000 (2.4 g) and dodecane (60 g).

On completion, the product is obtained as a suspension of black particles of copper chromite pigment in a matrix of poly(acrylamide), stabilised by Solsperse 11,000 and dispersed in dodecane (18.8% solids content).

Example 11

Preparation of a Dispersion of Black Copper Chromite Poly(Acrylamide) Particles

Similarly to Example 9, black polymer particles are prepared using water (17.6 g), (Black 34E33 basalt) copper chromite pigment (12.0 g) and poly(acrylamide) (9.6 g of a 50 wt % solution in water), Solsperse 11000 (2.4 g) and dodecane (60 g).

On completion, the product is obtained as a suspension of black particles of copper chromite pigment in a matrix of poly(acrylamide), stabilised by Solsperse 11,000 and dispersed in dodecane (22.6% solids content Example 12

Preparation of a Dispersion of Black Copper Chromite Poly(Acrylamide) Particles

Similarly to Example 9, black polymer particles are prepared using water (17.6 g), (Black 34E33 basalt) copper chromite pigment (3.0 g) and poly(acrylamide) (9.6 g of a 50 wt % solution in water), Solsperse 13650 (2.4 g) and dodecane (60 g).

On completion, the product is obtained as a suspension of black particles of copper chromite pigment in a matrix of poly(acrylamide), stabilised by Solsperse 13650 and dispersed in dodecane (21.9% solids content).

Example 13

Preparation of a Dispersion of Black Copper Chromite Poly(Acrylamide) Particles

Similarly to Example 9, black polymer particles are prepared using water (17.6 g), (Black 34E33 basalt) copper chromite pigment (3.0 g) and polyacrylamide) (9.6 g of a 50 wt % solution in water), Solplus K500 (2.4 g) and dodecane (60 g).

On completion, the product is obtained as a suspension of black particles of copper chromite pigment in a matrix of poly(acrylamide), stabilised by Solplus K500 and dispersed in dodecane (13% solids content).

Example 14

Preparation of a Dispersion of Black Copper Chromite Poly(Acrylamide) Particles

Similarly to Example 9, black polymer particles are prepared using water (17.6 g), (Black 34E33 basalt) copper chromite pigment (3.0 g) and poly(acrylamide) (9.6 g of a 50 wt % solution in water), Solsperse 17000 (2.4 g) and dodecane (60 g).

On completion, the product is obtained as a suspension of black particles of copper chromite pigment in a matrix of poly(acrylamide), stabilised by Solsperse 17000 and dispersed in dodecane (13.6% solids content).

Example 15

Preparation of a Dispersion of Black Iron (III) Oxide Particles

Similarly to Example 9, black polymer particles are prepared using industrial methylated spirits (20.0 g), iron (III) oxide pigment (Aldrich) (3.0 g) and poly(acrylic acid) (4.8 g of a 35 wt % solution in water), Solsperse 17000 (2.4 g) and dodecane (60 g).

On completion, the product is obtained as a suspension of black particles of iron oxide pigment in a matrix of poly (acrylic acid), stabilised by Solsperse 17000 and dispersed in dodecane (13.6% solids content).

Example 16

Preparation of a Dispersion of Carbon Black Particles

An internal phase is formed by combining industrial methylated spirits (20.0 g), (Special Black 4) carbon black pigment (3.0 g) and polyacrylic acid (4.8 g of a 35 wt % solution in water). This dispersion is stirred until homogeneous and is then submitted to homogenisation by a Branson Sonifier 450 using a horn probe at 40% strength for 5 minutes.

In a separate 3-neck flask a continuous phase is formed by combining Solsperse 17000 (2.4 g) and dodecane (60 g). This solution is stirred until homogeneous.

The internal phase is then added to the oil phase, and stirring is maintained for 3 further minutes. The pre-emulsion is then submitted to homogenisation by a Branson Sonifier 450 using a horn probe at 40% strength for 5 minutes to form the final emulsion. The emulsion is poured into a 500 ml Florentine flask and attached to a Buchi rotary evaporator. The bath temperature is set at 60° C. and the pressure is set at 300 mbar. Pressure is reduced in 50 mbar steps for approximately 10 minutes each time to 50 mbar pressure and left under these conditions for 1 hour to ensure removal of solvents.

On completion, the product is obtained as a suspension of black particles of carbon black pigment in a matrix of poly (acrylic acid), stabilised by Solsperse 17,000 and dispersed in dodecane.

Example 17

Electrophoretic Formulation Containing a Dispersion of Polyacrylamide-Manganese Ferrite Pigment Nanoparticles (Example 8)

The electrophoretic ink is prepared by vortex mixing 0.0609 g polyacrylamide-manganese ferrite pigment particles (8) and 1.9507 g dodecane. The dispersion is then roller mixed for 30 minutes.

Size (252.2 nm), Electrophoretic mobility (−0.0301 µmcm/Vs), ZP (−32.4 mV)

Example 18

Electrophoretic Formulation Containing a Dispersion of Polyacrylamide-Manganese Ferrite Pigment Particles (Example 8)

The electrophoretic ink is prepared by vortex mixing 0.0609 g polyacrylamide-manganese ferrite pigment particles (8), 0.0601 g AOT and 1.9507 g dodecane. The dispersion is then roller mixed for 30 minutes.

Size (250.1 nm), Electrophoretic mobility (0.0198 µmcm/Vs), ZP (+21.3 mV).

Example 19

Electrophoretic Formulation Containing a Dispersion of Polyacrylamide-Copper Chromite Pigment Particles (Example 9)

The electrophoretic ink is prepared by vortex mixing 0.0604 g polyacrylamide-copper chromite pigment particles (9), 0.06 g AOT and 1.8827 g dodecane. The dispersion is then roller mixed for 30 minutes.

Size (310.4 nm), Electrophoretic mobility (0.0241 µmcm/Vs), ZP (+26.0 mV)

Example 20

Electrophoretic Formulation Containing a Dispersion of Polyacrylamide-Copper Chromite Pigment Particles (Example 9)

The electrophoretic ink is prepared by vortex mixing 0.061 g polyacrylamide-copper chromite pigment particles (9), 0.0602 g Span 85 and 1.8814 g dodecane. The dispersion is then roller mixed for 30 minutes.

Size (266.9 nm), Electrophoretic mobility (−0.0227 μmcm/Vs), ZP (−24.4 mV)

Example 21

Electrophoretic Formulation Containing a Dispersion of Polyacrylamide-Copper Chromite Pigment Nanoparticles (Example 10)

The electrophoretic ink is prepared by vortex mixing 0.0601 g polyacrylamide-copper chromite pigment particles (10) and 1.9427 g dodecane. The dispersion is then roller mixed for 30 minutes.

Size (273.8 nm), Electrophoretic mobility (−0.0870 μmcm/Vs), ZP (−93.8 mV)

Example 22

Electrophoretic Formulation Containing a Dispersion of Polyacrylamide-Copper Chromite Pigment Nanoparticles (Example 11)

The electrophoretic ink is prepared by vortex mixing 0.0595 g polyacrylamide-copper chromite pigment particles (11) and 1.9402 g dodecane. The dispersion is then roller mixed for 30 minutes.

Size (314.9 nm), Electrophoretic mobility (−0.0846 μmcm/Vs), ZP (−91.2 mV)

Example 23

Electrophoretic Formulation Containing a Dispersion of Polyacrylamide-Copper Chromite Pigment Nanoparticles (Example 12)

The electrophoretic ink is prepared by vortex mixing 0.06 g polyacrylamide-copper chromite pigment particles and 1.9402 g dodecane. The dispersion is then roller mixed for 30 minutes.

Size (404.9 nm), Electrophoretic mobility (−0.0388 μmcm/Vs), ZP (−41.9 mV)

Example 24

Electrophoretic Formulation Containing A Dispersion Of Polyacrylamide-Copper Chromite Pigment Particles (Example 13)

The electrophoretic ink is prepared by vortex mixing 0.06 g polyacrylamide-copper chromite pigment particles, 0.0603 g AOT and 1.8882 g dodecane. The dispersion is then roller mixed for 30 minutes.

Size (345.2 nm), Electrophoretic mobility (0.0274 μmcm/Vs), ZP (+29.5 mV)

Example 25

Electrophoretic Formulation Containing A Dispersion Of Polyacrylamide-Copper Chromite Pigment Particles (Example 14)

The electrophoretic ink is prepared by vortex mixing 0.0601 g poly(acrylamide)-copper chromite pigment particles, 0.0601 g AOT and 1.8853 g dodecane. The dispersion is then roller mixed for 30 minutes.

Size (231.4 nm), Electrophoretic mobility (0.0436 μmcm/Vs), ZP (+46.9 mV)

Example 26

Electrophoretic Formulation Containing a Dispersion of Poly(Acrylic Acid)-Iron Oxide Pigment Particles (Example 15)

The electrophoretic ink is prepared by vortex mixing 0.060 g poly(acrylic acid)-iron(III) oxide pigment particles, 0.060 g AOT and 1.880 g dodecane. The dispersion is then roller mixed for 30 minutes.

Size (216.4 nm), Electrophoretic mobility (−0.0126 μmcm/Vs), ZP (−13.6 mV)

Example 27

Electrophoretic Formulation Containing a Dispersion of Poly(Acrylic Acid)-Carbon Black Pigment Particles (Example 16)

The electrophoretic ink is prepared by vortex mixing 0.0601 g poly(acrylic acid)-carbon black pigment particles and 1.9463 g dodecane.

The dispersion is then roller mixed for 30 minutes.

Size (292.2 nm), Electrophoretic mobility (−0.02147 μmcm/Vs), ZP (−23.1 mV)

Example 28

Electrophoretic Formulation Containing a Dispersion of Poly(Acrylic Acid)-Carbon Black Pigment Particles (Example 16)

The electrophoretic ink is prepared by vortex mixing 0.0604 g poly(acrylic acid)-carbon black pigment particles, 0.0602 g AOT and 1.8893 g dodecane. The dispersion is then roller mixed for 30 minutes.

Size (305.9 nm), Electrophoretic mobility (−0.04133 μmcm/Vs), ZP (−44.5 mV)

Example 29

Electrophoretic Formulation Containing a Dispersion of Poly(Acrylic Acid)-Carbon Black Pigment Particles (Example 16)

The electrophoretic ink is prepared by vortex mixing 0.06 g poly(acrylic acid)-carbon black pigment particles, 0.0601 g Span 85 and 1.8829 g dodecane. The dispersion is then roller mixed for 30 minutes.

Size (270.9 nm), Electrophoretic mobility (−0.02903 μmcm/Vs), ZP (−31.3 mV)

The invention claimed is:
1. A process for the preparation of coloured or black polymer particles for use in electrophoretic devices, said process comprising
 a) forming a reverse emulsion comprising the steps of:
  a1) forming a polar phase by mixing at least one polymer, at least one coloured or black inorganic pigment, and at least one polar solvent;
  a2) forming a non-polar phase by mixing at least one non-polar solvent, and at least one surfactant;
  a3) combining the polar phase and the non-polar phase; and a4) homogenising the combined phases to form the reverse emulsion; and b) removing the polar solvent or polar solvents from the reverse emulsion with an evaporative method.

2. The process of claim 1, wherein the at least one coloured or black inorganic pigment is a carbon black pigment or a metal compound selected from the group consisting of oxide, mixed oxide, oxide hydroxide, sulfide, sulfoselenide, silicate, sulfate, chromite, molybdate, and carbonate.

3. The process of claim 2, wherein the metal in the metal compound is selected from the group consisting of iron, chromium, cadmium, nickel, zinc, cobalt, and manganese.

4. The process of claim 1, wherein the coloured or black inorganic pigment particles is selected from the group consisting of red iron oxide, green chromium oxide, cobalt blue pigment, yellow iron oxide pigment, manganese ferrite pigment, black copper chromite pigment, black iron (III) oxide pigment, and carbon black pigment.

5. The process of claim 1, wherein the polymer of step a) is hydrophilic and/or charged.

6. The process of claim 1, wherein the polar solvent used in step a) is selected from the group consisting of water, ethanol, acetonitrile, DMSO, DMF, and mixtures thereof.

7. The process of claim 1, wherein the non-polar solvent used in step a) is selected from the group consisting of dodecane, tetradecane, decane, nonane, dimethyltetralin, decalin, naphtha, tetrahydronaphthalene, and mixtures thereof.

8. The process of claim 1, wherein the non-polar solvent has a refractive index and a density similar to that of the polymer.

9. A coloured or black polymer particle obtained by the process of claim 1.

10. A mono, bi, or polychromal, electrophoretic device comprising at least one coloured or black polymer particle of claim 9.

11. An electrophoretic fluid comprising at least one coloured or black polymer particle of claim 9.

12. The electrophoretic fluid of claim 11, wherein the at least one coloured particle is red, green, and/or blue, and is used in combination with black polymer particles.

13. An electrophoretic display device comprising the electrophoretic fluid of claim 11.

14. The electrophoretic display device of claim 13, wherein the electrophoretic fluid is applied by a contact or contactless printing or deposition technique.

15. The electrophoretic display device of claim 14, wherein the contact or contactless printing or deposition technique is selected from inkjet printing, slot die spraying, nozzle spraying, and flexographic printing.

16. The process of claim 6, wherein the polar solvent is selected from the group consisting of water, ethanol, and mixtures thereof.

17. The process of claim 7, wherein the non-polar solvent used in step a) is selected from the group consisting of dodecane, dimethyltetralin, and mixtures thereof.

18. The process of claim 8, wherein the non-polar solvent used is dodecane.

19. The process of claim 1, wherein the at least one coloured or black inorganic pigment is selected from a black, red, green, yellow, and/or blue pigments.

20. The process of claim 1, wherein the prepared reverse emulsions of steps a1) to a4) are selected from the group consisting of:

water, red iron oxide, polyacrylamide, surfactant, and dodecane;

water, green chromium oxide, polyacrylamide, surfactant, and dodecane;

water, cobalt blue pigment, polyacrylamide, surfactant, and odecane;

water, yellow iron oxide, polyacrylamide, surfactant, and dodecane;

water, black copper chromite, polyacrylamide, surfactant, and dodecane;

water, black iron oxide, polyacrylic acid, surfactant, dodecane; and water, industrial methylated spirits, carbon black, polyacrylic acid, surfactant, and dodecane.

21. The process of claim 1, further comprising c) removing the non-polar solvent or non-polar solvents.

22. A process for the preparation of coloured or black polymer particles for use in electrophoretic devices, said process comprising;

forming a reverse emulsion by combining a non-continuous phase including at least one polymer, coloured or black inorganic pigment particles, and at least one polar solvent, with a continuous phase that includes at least one non-polar solvent with a dielectric constant $\in$ of from 2.0 to 2.8, and at least one surfactant, and removing the polar solvent or polar solvents from the reverse emulsion with an evaporative method.

* * * * *